United States Patent

[11] 3,582,625

[72] Inventors Roland Rouxel
Seyssinet;
Jean-Luc Melennec, Grenoble, both of, France
[21] Appl. No. 734,102
[22] Filed June 3, 1968
[45] Patented June 1, 1971
[73] Assignee The Battelle Development Corporation
Columbus, Ohio
[32] Priority June 2, 1967
[33] Switzerland
[31] 7868/67

[54] CONTROL METHOD AND APPARATUS FOR EXTREMALIZING THE VALUE OF A FINAL CONTROLLED VARIABLE OF AN INSTALLATION
4 Claims, 3 Drawing Figs.

[52] U.S. Cl. .................................................... 235/150.1,
331/45, 328/27
[51] Int. Cl. .................................................... G05b 13/02
[50] Field of Search ............................................ 235/150.1,
150.2; 318/20.050

[56] References Cited
UNITED STATES PATENTS
2,628,606   2/1953   Draper et al. .................. 123/102
3,109,970   11/1963   Smyth .......................... 235/150.1(X)
3,142,967   8/1964   Schweitzer .................... 60/105

*Primary Examiner*—Eugene G. Botz
*Attorney*—Gray, Mase and Dunson

ABSTRACT: The invention provides an improvement to an usual method of optimalizing the control of an industrial installation by periodically and continuously disturbing a regulating variable governing the operation of the installation. To avoid the drawbacks due to the inherent phase-shift of the installation, the improvement consists in modifying the periodic disturbance in dependence on the instantaneous value of the final controlled variable by multiplying the pilot signal used in the usual control method by a periodic signal having the same shape and frequency as that used in this usual control method, but which is in quadrature therewith, by producing an adapting signal equal to the integral of the result of this multiplication, by adding this adapting signal to a reference signal and by causing the frequency of the periodic disturbance to vary proportionately with the signal resulting from this addition.
The apparatus for carrying out this improved method comprises, in addition to the usual circuits, a multiplier, an integrator and an adder connected in succession, the output of the adder being connected to the frequency control input of the generator delivering the disturbance signal.

CONTROL METHOD AND APPARATUS FOR EXTREMALIZING THE VALUE OF A FINAL CONTROLLED VARIABLE OF AN INSTALLATION

This invention firstly provides a control method for extremalizing the value of a final controlled variable of an installation by acting on at least one regulating variable thereof, which comprises continuously producing a pilot signal having a value which is a linear function of at least one of three variable, i.e. the instantaneous value of said controlled variable, its first time-derivative and its second time-derivative, and acting upon the regulating variable in dependence on a first periodic signal and on an adjustment signal which is proportional to the time-integral of the product of the pilot signal and of a second periodic signal of same frequency as the first, thereby to obtain the optimal value of the regulating variable to which corresponds the extremal value of said controlled variable.

As is known, such methods, used for optimization by the so-called "continuous periodic disturbance" procedure, have the advantage that they can be resorted to even in the presence of high level noise signals superposed on said pilot signal. The performances, and in particular the stability, that can be achieved with these methods depend inter alia on the phase-shift to which the periodic disturbance is subjected through the installation and it is generally sought to render this phase-shift negligible by selecting a relatively low frequency for said first periodic signal, i.e. for the continuous periodic disturbance signal. This however gives rise to the drawback that the search for the optimum by means of said adjustment signal becomes relatively slow.

Although it is possible to increase the speed of the search by choosing a high frequency for the continuous periodic disturbance signal, it then becomes necessary to compensate the phase-shift to which this disturbance signal has been subjected through the installation in order to ensure good stability. To this end, it has been proposed to resort to a simplified dynamic model of the installation for phase-shifting the periodic signal which is to be multiplied by the pilot signal with a view to forming, after integration, said adjustment signal.

It should however be noted that in many cases the dynamic characteristics of the installation which is to operationally be optimized are not known and that consequently the phase-shift to which the disturbance signal has been subjected through the installation is also unknown. Moreover, this phase-shift can vary with the working conditions of the installation.

An object of the present invention is to free the above control method from these drawbacks and to enable this method to optimize quickly and effectively, by continuous periodic disturbance, the operation of an installation. The control method provided by the invention is characterized by producing a frequency adapting signal which is proportional to the time-integral of the product of said pilot signal and of a third periodic signal which is identical to said second signal but which is phase-shifted by an angle of $\pi/2$ in relation thereto and by controlling the frequency of these three periodic signals linearly in dependence on said frequency adapting signal.

The invention secondly provides control apparatus for extremalizing the value of a final controlled variable of an installation by acting on at least one regulating variable thereof, which comprises a measuring and computing device which continuously produces a pilot signal having a value which is a linear function of a least three variables, i.e. the instantaneous value of said controlled variable, its first time-derivative and its second time-derivative, a signals generator for producing first, second and third periodic signals of same frequency, a first multiplier for delivering a signal which is proportional to the product of said pilot signal and of said second periodic signal, a first integrator for receiving the signal delivered by said first multiplier and for delivering an adjustment signal, a first adder for delivering to an element for controlling said regulating variable an optimal control signal which corresponds to the sum of said adjustment signal and for said first periodic signal, and which further comprises a second multiplier for delivering a signal which is proportional to the product of said pilot signal and of said third periodic signal, a second integrator for receiving the signal delivered by said second multiplier and for delivering a frequency adapting signal, and a second adder for delivering to said signals generator a frequency control signal which corresponds to the sum of said adapting signal and of a frequency reference signal.

Figure 1:
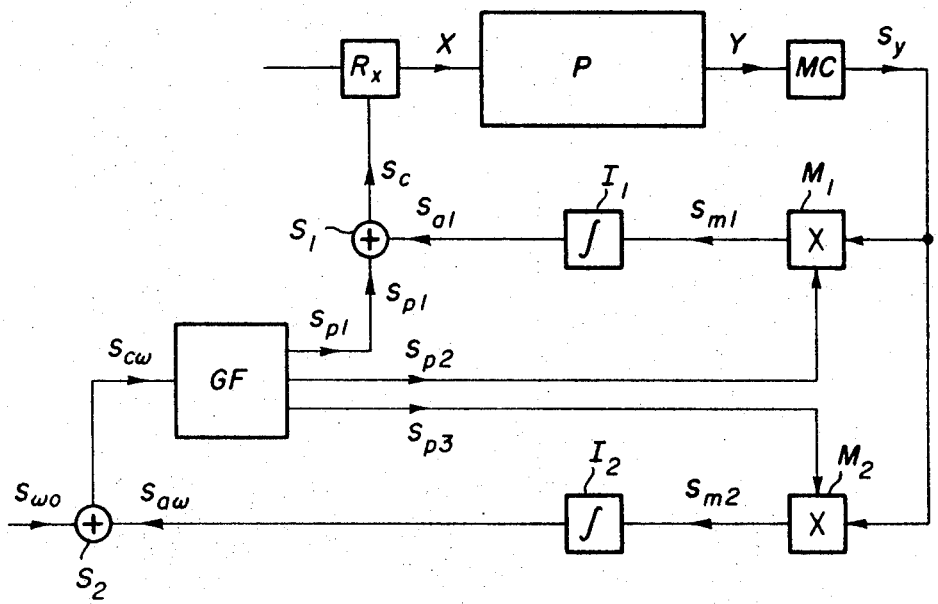
FIG. 1 is a block diagram of an embodiment of the apparatus provided by the present invention for controlling an installation.

The control apparatus shown in FIG. 1 serves to optimize the operation of an installation P by acting through a regulating element $R_x$ on an input variable, i.e. on a regulating variable X, so as to extremalize the value of a final controlled variable Y of this installation.

The apparatus shown in FIG. 1 includes a first portion for producing an optimal control signal $s_c$ for the regulating element $R_x$. This first portion comprises the elements which are generally resorted to for optimalization by the continuous periodic disturbance procedure, i.e. a measuring and computing device MC, a periodic signals generator GF, a multiplier $M_1$, an integrator $I_1$ and an adder $S_1$.

The measuring and computing device MC serves to produce a pilot signal $s_y$ which corresponds to a linear function of at least one of the three variable, i.e. the instantaneous value of the controlled variable Y, its first time-derivative and its second time-derivative. Thus the device MC typically may comprise conventional electronic components such as operational amplifiers, differentiators, and adders, in obvious and conventional arrangements. For example, it may be similar to the measuring and calculating circuit CMC shown in FIGS. 1 and 2 of U.S. Pat. Ser. No. 3,510,635 of Roland Rouxel et al. and described in column 4, lines 59—73. The generator GF delivers, to the adder $S_1$, a first periodic signal $s_{p1}$ which acts as the continuous disturbance signal, and, to the multiplier $M_1$, a second periodic signal $s_{p2}$ which has the same frequency as the first and which is phase-shifted in relation thereto by a predetermined angle ($\Phi_o$). The multiplier $M_1$ receives the signals $s_y$ and $s_{p2}$ and delivers a signal $s_{m1}$, corresponding to their product, to the integrator $I_1$. The latter delivers to the adder $S_1$ an adjustment signal $s_{a1}$ for varying the regulating variable X towards its optimal value. The adder $S_1$ thus serves to add the signal $s_{p1}$ and $s_{a1}$ together and to deliver an optimal control signal $s_c$ to the regulating element $R_x$.

As can be seen from FIG. 1, the control apparatus moreover comprises a second portion consisting of a frequency adapting loop which includes a multiplier $M_2$, an integrator $I_2$ and an adder $S_2$. In addition to the signals $s_{p1}$ and $s_{p2}$, generator GF delivers a third periodic signal $s_{p3}$ of same frequency, which is phase-shifted in relation to the second signal $s_{p2}$ by an angle of $\pi/2$.

Multiplier $M_2$ receives the pilot signal $s_y$ and this third periodic signal $s_{p3}$ and delivers a signal $s_{m2}$, corresponding to their product, to the integrator $I_2$. The latter delivers a frequency adapting signal $s_{a\omega}$ to the adder $S_2$ which also receives a frequency reference signal $s_{\omega o}$. The adder $S_2$ thus serves to add signals $s_{a\omega}$ and $s_{\omega o}$ and to deliver a signal $s_{c\omega}$ for controlling the frequency of signals $s_{p1}$, $s_{p2}$ and $s_{p3}$ delivered by the periodic signals generator GF.

Figure 2:
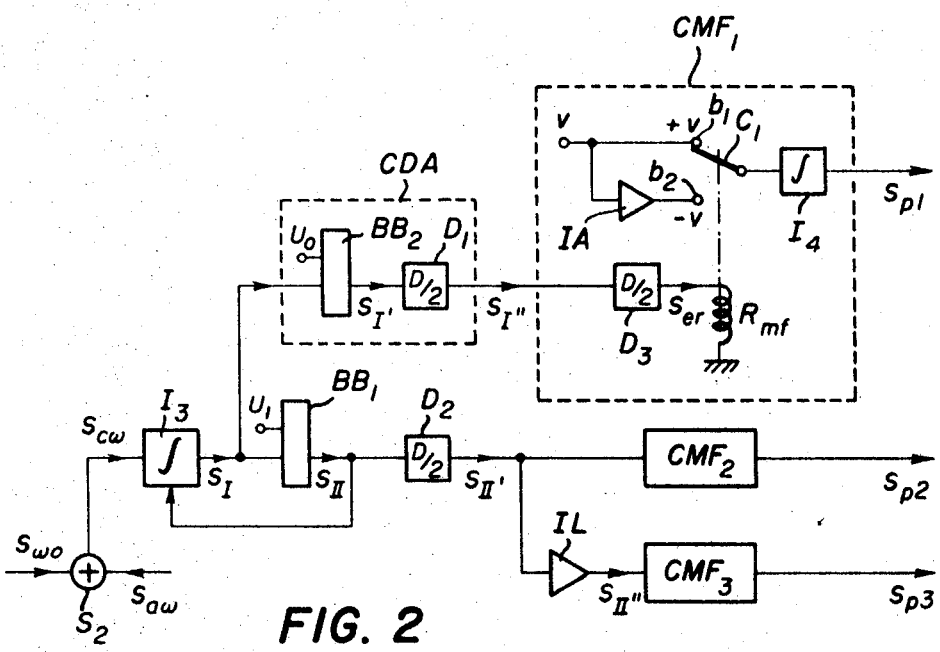
FIG. 2 is a diagrammatic representation of one form of periodic signals generator used in the apparatus shown in FIG. 1.
Figure 3:
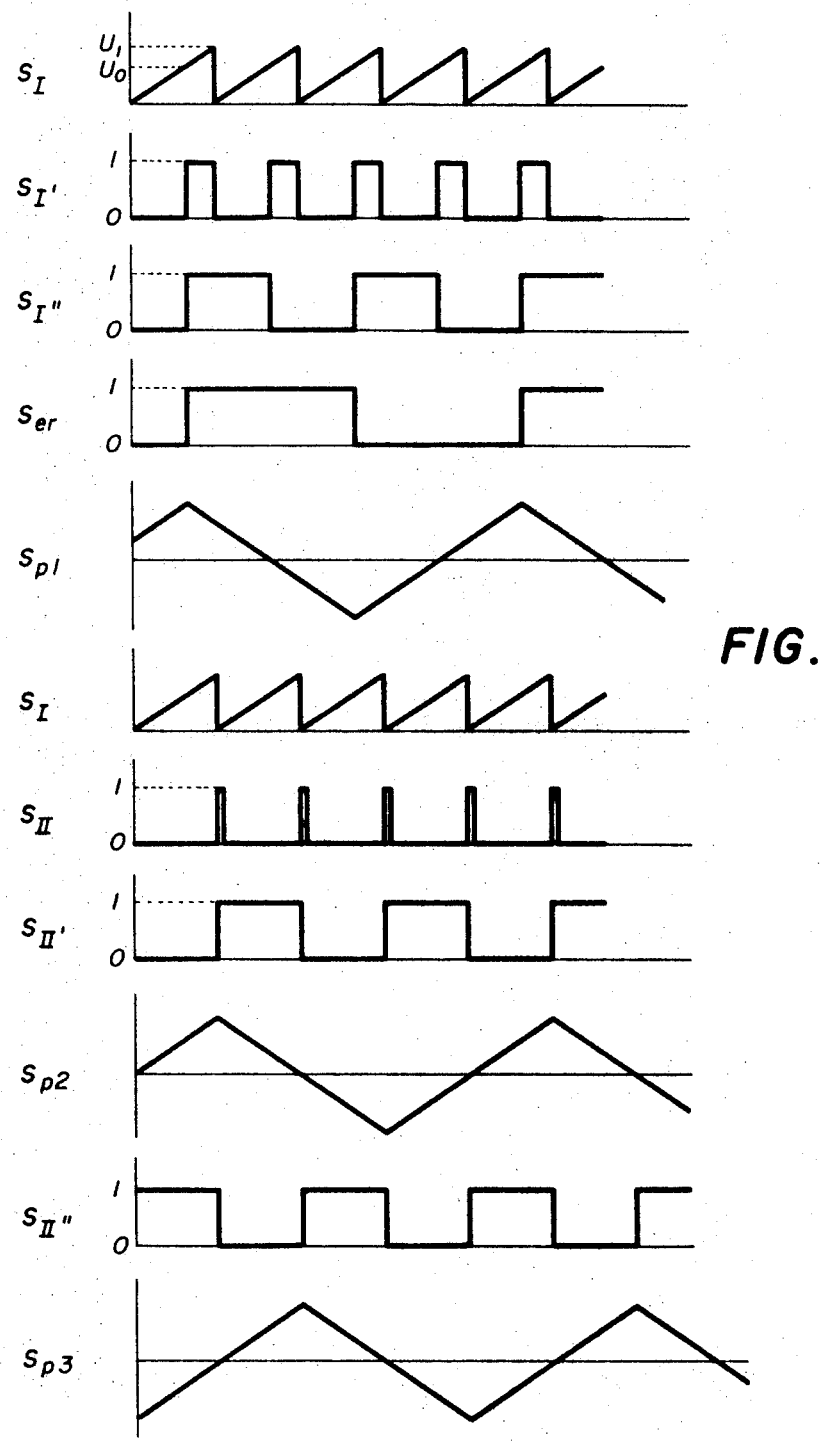
FIG. 3 is an explanatory chart illustrating the shape of the various signals produced by the generator shown in FIG. 2.

With the generator GF as shown in FIG. 2, signals $s_{p1}$, $s_{p2}$ and $s_{p3}$ which are delivered thereby have a common frequency which varies proportionately with the frequency control signal $s_{c\omega}$, signal $s_{p2}$ is phase-shifted by a constant angle, referenced $\Phi_o$, in relation to signal $s_{p1}$ and signal $s_{p3}$ is phase-shifted by $\pi/2$ in relation to signal $s_{p2}$. As shown in FIG. 2, the generator comprises here an analog integrator $I_3$ which receives the frequency control signal $s_{c\omega}$ and delivers a signal $s_I$ to a bistable multivibrator $BB_1$. The latter produces a logic signal $s_{II}$ equal to 1 when its input signal $s_1$ reaches a predetermined threshold $u_1$, and this signal $s_{II}$ of value 1 serves to reset the integrator $I_3$. Thus, the control signal $s_{c\omega}$ is converted into a triangular periodic signal $s_I$ as shown in FIG. 3. The period and hence the frequency of signal $s_I$, which serves as a base signal in producing signals $s_{p1}$, $s_{p2}$ and $s_{p3}$, are thus determined by the amplitude of the frequency control signal $s_{c\omega}$.

To produce the continuous periodic disturbance signal $s_{pl}$, the signals generator represented in FIG. 2 comprises a phase-shifting circuit CDA which includes a bistable multivibrator $BB_2$ and a logic by-two divider $D_1$. The bistable multivibrator $BB_2$ receives the periodic signal $s_I$ and a reference signal $u_o$ which is less than the reference signal $u_1$ of the multivibrator $BB_1$. This signal $u_o$ is so selected that $u_o/u_1 \times \pi/2$ may be equal to a desired phase-shift angle $\Phi_o$. Thus, the multivibrator $BB_2$ converts $s_I$ into a logic signal $s_{I'}$ which has the same frequency as $s_{II}$ and which is equal to 1 when $s_I$ is greater than $u_o$. The divider $D_1$ delivers a logic signal $s_{I''}$ having a frequency half that of $s_{I'}$ (see FIG. 3). A shaping circuit $CMF_1$ finally serves to form the periodic analog signal $s_{p1}$ from the logic signal $s_{I''}$.

To produce the periodic signals $s_{p2}$ and $s_{p3}$, the signals generator represented in FIG. 2 comprises a logic by-two divider $D_2$ which receives the signal $s_{II}$ from multivibrator $BB_1$ and delivers a square logic signal $s_{II'}$. A shaping circuit $CMF_2$ serves to convert this logic signal $s_{II'}$ into a periodic analog signal $s_{p2}$. This signal $s_{II'}$ is also fed to a logic inverter IL which delivers a signal $s_{II''}$, this latter signal being thus phase-shifted by $\pi$ in relation to $s_{II'}$. A shaping circuit $CMF_3$ finally serves to form the periodic analog signal $s_{p3}$ from the logic signal $s_{II''}$, signal $s_{p3}$ being phase-shifted by $\pi/2$ in relation to $s_{p2}$.

As is apparent from FIG. 3, which shows the above-mentioned periodic signals, the shaping circuits $CMF_1$, $CMF_2$ and $CMF_3$ all have the same function. These three shaping circuits being identical, only one ($CMF_1$) has been represented in detail in FIG. 2 in order to simplify the drawing. As shown in this Figure, circuit $CMF_1$ comprises a logic by-two divider $D_3$, a relay $R_{mf}$ which controls a changeover switch $C_1$, and an integrator $I_4$ which is intended to be connected by this switch to a direct voltage source V either directly to supply voltage +V, or indirectly through an inverter IA to supply voltage −V. The divider $D_3$ receives the logic signal $s_{I''}$ and converts it into an energization signal $s_{er}$ for relay $R_{mf}$, the frequency of signal $s_{er}$ being half that of $s_{I''}$. Thus, as can be seen from FIG. 2, when the relay is energized ($s_{er}=1$), the input of integrator $I_4$ is connected to pole $b_2$ (voltage −V) of the switch, and when the relay is deenergized ($s_{er}=0$), the input of integrator $I_4$ is connected to pole $b_1$ (voltage +V).

As will be apparent from FIG. 3, the logic signals $s_{I''}$, $s_{II'}$ and $s_{II''}$ are thus converted into periodic triangular signals $s_{p1}$, $s_{p2}$ and $s_{p3}$, respectively, by the shaping circuits $CMF_1$, $CMF_2$ and $CMF_3$.

It is also possible to effect frequency adapting, through signal $s_{a\omega}$, and optimum searching independently of one another. To this end, a make and break switch is placed before each of integrators $I_1$ and $I_2$.

We claim:

1. A control method for extremalizing the value of a final controlled variable of an installation by acting on at least one regulating variable thereof, which comprises continuously producing a pilot signal having a value which is a linear function of at least one of three variables, i.e. the instantaneous value of said controlled variable, its first time-derivative and its second time-derivative, and acting upon the regulating variable in dependence on a first periodic signal and on an adjustment signal which is proportional to the time-integral of the product of the pilot-signal and of a second periodic signal of same frequency as the first, thereby to obtain the optimal value of the regulating variable to which corresponds the extremal value of said controlled variable, and which is characterized by producing a frequency adapting signal which is proportional to the time-integral of the product of said pilot signal and of a third periodic signal which is identical to said second signal but which is phase-shifted by an angle of $\pi/2$ in relation thereto and by controlling the frequency of these three periodic signals linearly in dependence on said frequency adapting signal.

2. A control method according to claim 1, which comprises subjecting said first periodic signal to a phase lead in relation to said second periodic signal thereby to maintain between said first and second periodic signals a predetermined constant phase-shift.

3. An optimal control method through oscillations for extremalizing a final controlled variable characteristic of the operation of an installation performing an industrial process, which comprises subjecting at least one of the regulating variables governing said process to a periodic variation which is given an amplitude proportional to the sum of an adjustment signal and of a first periodic signal which is produced by a generator delivering three periodic signals of same shape and of same frequency, the second of said three periodic signals being phase-shifted by a given amount in relation to the first, said adjustment signal being derived from said final controlled variable by producing three signals representing, respectively, the instantaneous value of said final controlled variable, its first time-derivative and its second time-derivative, by producing a pilot signal consisting of a linear combination of at least one of said three signals, by multiplying said pilot signal by said second periodic signal and by obtaining the time-integral of the result of this multiplication, and which is characterized by producing the third said periodic signal in quadrature with the second, by producing a frequency reference signal, by producing a frequency adapting signal by multiplying said pilot signal by said third periodic signal and by obtaining the time-integral of the result of this multiplication, by producing a frequency control signal by obtaining the sum of said frequency reference signal and of said frequency adapting signal, and by modifying the frequency of the signals delivered by said generator by subjecting said frequency to a variation having an amplitude proportional to that of said frequency control signal.

4. Control apparatus for extremalizing the value of a final controlled variable of an installation by acting on at least one regulating variable thereof, which comprises a measuring and computing device which continuously produces a pilot signal having a value which is a linear function of at least three variable, i.e. the instantaneous value of said controlled variable, its first time-derivative and its second time-derivative, a signal generator for producing first, second and third periodic signals of same frequency, said third periodic signal being phase-shifted by an angle of $\pi/2$ in relation to said second periodic signal, a first multiplier for delivering a signal which is proportional to the product of said pilot signal and of said second periodic signal, a first integrator for receiving the signal delivered by said first multiplier and for delivering an adjustment signal, a first adder for delivering to an element for controlling said regulating variable an optimal control signal which corresponds to the sum of said adjustment signal and of said first periodic signal, and which further comprises a second multiplier for delivering a signal which is proportional to the product of said pilot signal and of said third periodic signal, a second integrator for receiving the signal delivered by said second multiplier and for delivering a frequency adapting signal, and a second adder for delivering to said signals generator a frequency control signal which corresponds to the sum of said adapting signal and of a frequency reference signal.